United States Patent [19]

Baumann

[11] 4,296,915
[45] Oct. 27, 1981

[54] ECCENTRIC ROTARY DISK VALVE WITH ELASTIC METAL SEAL

[76] Inventor: Hans D. Baumann, 32 Pine St., Rye, N.H. 03870

[21] Appl. No.: 179,944

[22] Filed: Aug. 21, 1980

[51] Int. Cl.³ ............................................. F16K 1/226
[52] U.S. Cl. ...................................... 251/174; 251/306
[58] Field of Search ...................... 251/305, 306, 174

[56] References Cited

U.S. PATENT DOCUMENTS

| | | |
|---|---|---|
| 2,768,806 | 10/1956 | Koehler ............................... 251/174 |
| 3,077,331 | 2/1963 | Burtis .................................. 251/174 |
| 3,077,332 | 2/1963 | Burtis .................................. 251/174 |
| 3,458,172 | 7/1969 | Burrows .............................. 251/174 |
| 3,578,288 | 5/1971 | Rishovd .............................. 251/306 |
| 3,834,663 | 9/1974 | Donnelly ............................. 251/306 |
| 3,885,771 | 5/1975 | Baumann ............................. 251/315 |
| 3,960,177 | 6/1976 | Baumann ............................. 251/305 |
| 3,963,213 | 6/1976 | Brattberg ............................ 251/306 |
| 4,058,290 | 11/1977 | Nelimarkka ......................... 251/306 |
| 4,231,546 | 11/1980 | Eggleston et al. .................. 251/174 |
| 4,241,895 | 12/1980 | Sternenberg et al. ............... 251/306 |

FOREIGN PATENT DOCUMENTS

| | | | |
|---|---|---|---|
| 1354265 | 1/1964 | France ................................ 251/174 |
| 383104 | 12/1964 | Switzerland ....................... 251/174 |

Primary Examiner—H. Jay Spiegel

[57] ABSTRACT

A rotary shut-off valve featuring an eccentric shaft mounted disk having a spherical periphery co-operating with a flexible metal seal, the latter forming a circle whose center is offset from and rotatingly mounted around the central valve axis to enable alignment with the central axis of said spherical disk periphery to effect tight shut-off.

5 Claims, 3 Drawing Figures

ECCENTRIC ROTARY DISK VALVE WITH ELASTIC METAL SEAL

BACKGROUND OF THE INVENTION

This application relates to and is a further improvement of my U.S. Pat. No. 3,885,771, in that it provides for manual or piston operated shut-off valves of the eccentric rotary disk type used for tight shut-off purposes as demanded by piping systems handling gaseous or liquid media.

My previous invention, more suitable for automatic control purposes, featured an eccentrically mounted plug, co-operating with a rigid metal seal which did not provide the degree of leak tightness demanded by on-off valves.

The present invention provides for a unique combination of a fluid pressure actuated seal made from a relatively flexible material such as a high strength nickel alloy, with the eccentrically adjustable seat ring, featured in the above referenced patent, to add perfect geometric alignment towards the rotating disk thereby assuring repeatable tight shut-off regardless of flow direction.

A further objection of this invention is the employment of an eccentric disk of well known prior art for compact construction and low mass. However, contrary to prior art, sealing between the spherical disk periphery and the seat ring is greatly simplified in that the controlling distance between disk and seat ring is no longer dependent upon very tight machining tolerances within the valve body, but can be adjusted very simply during the final assembly stage by rotating the eccentric seat ring around the periphery of the disk until both axis are properly aligned.

In the prior are U.S. Pat. No. 4,058,290, showing a disk co-operating with a metallic packing or seal ring, alignment is accomplished via radial displacement of the seal ring by the disk. The disadvantage here is the difficult-to-machine shape of the disk and the requirement for the seal ring to form a movable seal not only against the disk, but also against the housing itself. My invention does not have these disadvantages.

Yet another objection of my invention is the provision of a rotating disk having greatly reduced hydrodynamic torque values.

Finally, my invention utilizes a centrally open hub section around the shaft not only to facilitate the machining operation of the disk, but also to increase the available flow area and thereby improve the flow capacity of my invention over similar valves of established art.

DETAILED DESCRIPTION OF THE INVENTION

Figure 1:
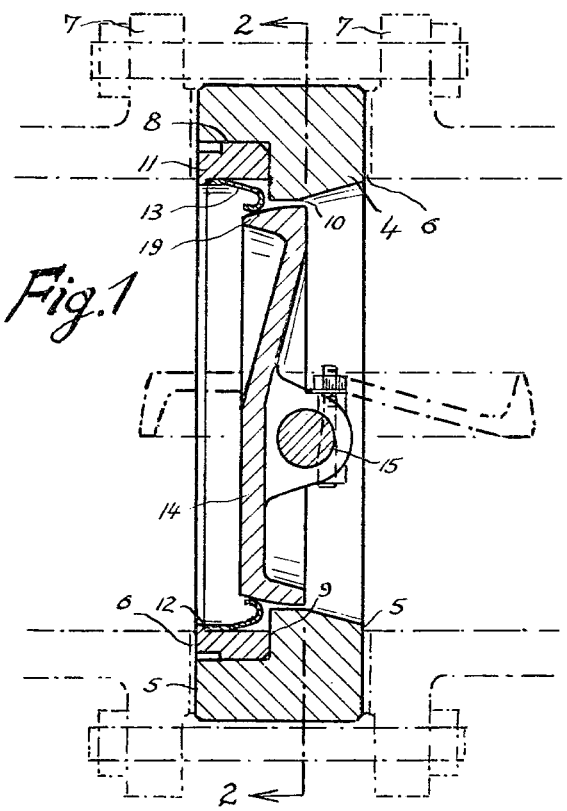
FIG. 1 is a central cross sectional view showing a preferred embodiment of my invention forming part of a piping system.
Figure 3:
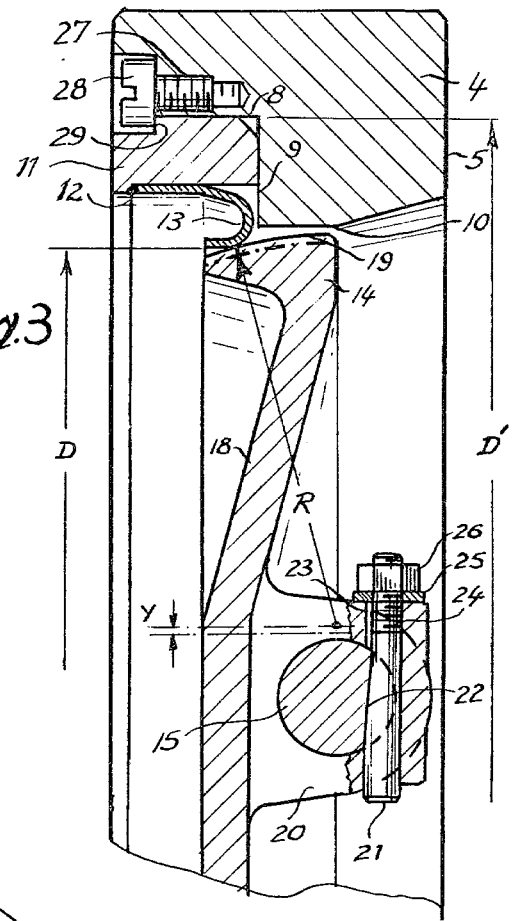
FIG. 3 is an enlarged sectional view of a portion of FIG. 1, with partially sectioned hub.
Figure 2:
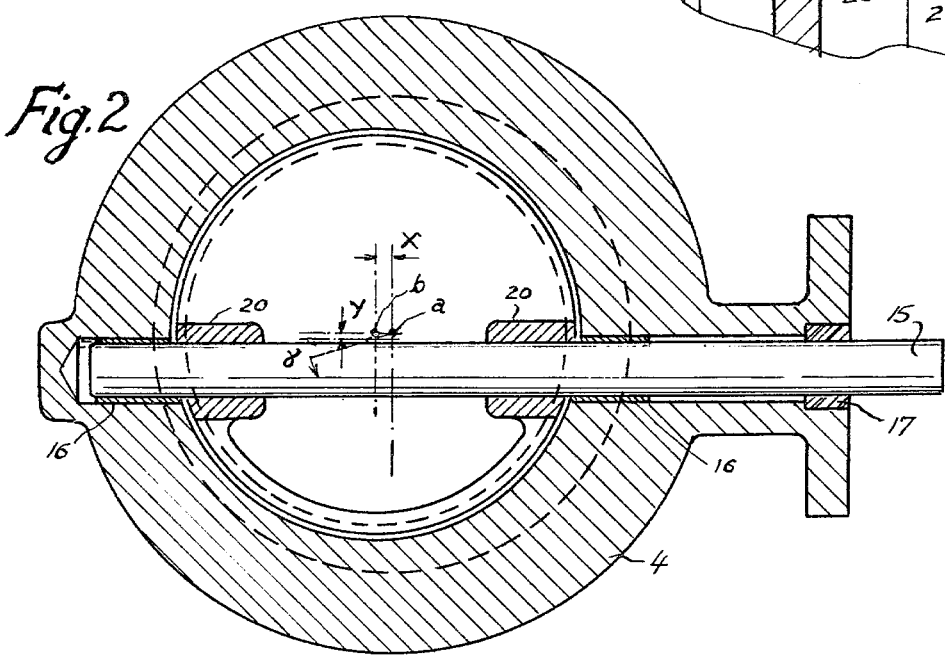
FIG. 2 is a transverse section of the invention taken on lines 2—2.

The invention Eccentric Rotary Disk Valve, consists in part of a tubular housing 4 made in the preferred embodiment, shown in FIG. 1, from steel plate having abutting faces 5 co-operating with line gaskets 6 and pipe flanges 7 (shown dashed) to form parts of a piping system. Housing 4 has a straight cylindrical passage 8 commencing from one of the abutting faces 5 and having a stop shoulder at 9 forming thereafter a reduced cross sectional bore 10. A ring shaped seal assembly 11 is slidingly engaged within passage 8 and has a reduced bore diameter 12 retaining within an elastic metal seal ring 13. As shown in FIG. 3, seal ring 13 is made from spun or hydro-formed thin metal sheets and has a semi-circular shape in the circumferential direction. The exterior periphery of this semi-circular portion forms a seating diameter D whose axis b (see FIG. 2) is offset from the axis of D', the outside diameter of seal assembly 11 (designated as a in FIG. 2) by an amount indicated as x.

Housing bore 10 retains within an eccentrically rotating disk 14 which is tiltingly arranged around a shaft 15 penetrating said housing 4 in the perpendicular horizontal axis. Shaft 15 is further supported by guide bushings 16 and sealed by a conventional packing 17. Eccentric disk 14 has a wall member 18 interconnecting with a semi-spherical circumferential ring portion 19 whose outer surface is machined with a radius R originating from axis b shown in FIG. 2 and forming a seating surface which, when brought in contactwith flexible metal seal 13 provides for tight shut-of of my invention. Disk 14 furthermore incorporates two hub portions 20 which are separated from each other to leave shaft 15 exposed throughout the central part of disk 14. This arrangement facilitates machining operation of periphery 19 and also provides for additional fluid passages when disk 14 is in the fully opened position as indicated by dashed lines in FIG. 1. Referring to FIG. 3, each of the two hubs has a fastening arrangement consisting of a cylindrical pin 21 having a partially tapered surface 22 co-operating with a complimentary surface on a portion of shaft 15. Pin 21 engages slidingly in a bore 23 transgressing hub portion 20. Pin 21 furthermore has a threaded upper portion 24 which is used in conjunction with a washer 25 and a hex nut 26 to tightly engage the two tapered surfaces 22, thus enabling transmission of torque and rotary motion from shaft 15 to disk 14.

Tight shut-off of eccentric disk valves co-operating with non-yieldable metal seats demand eccentrically tight machining tolerances. This in turn makes the manufacturing cost very high and virtually eliminates the future exchange of spare parts not previously custom fitted with a specific set of parts.

My invention overcomes these problems by providing for the ability to adjust the intermeshing parts during the assembly process thereby compensating for the manufacturing tolerances of the various mating parts. This adjustment is accomplished by allowing seal assembly 11 with its eccentrically located seal ring 13 to rotate within passage 8 until the geometric center of seal ring bore D matches the true center b of disk seating surface 19.

For example, assuming the origin of the spherical seating radius R is machined incorrectly from the desired location and offset by an amount y as shown in FIG. 3, then seal assembly 11 together with suitably fastened seal ring 13 is rotated around center point "a" by an angular distance $\gamma$ until the center of seal ring diameter D is moved downwards by the offset y thereby matching the true disk location. The final angular location of seal ring assembly 11 can now be fixed by suitable means consisting, for example, of one or more screws 27 located within housing 4 and whose cylindrical head portion 28 engages a circular shoulder 29 machined in the outer periphery of seal assembly 11.

Wall member 18 of eccentric disk 14 is angularly tilted to form, together with seating periphery 19, a generally Z-shaped cross section; the purpose of which is the reduction of hydrodynamic torque which has to be overcome in order to open the valve fully. This particular cross sectional shape of the disk of my invention provides pockets for impingement, in either flow direction, thereby reducing greatly the suction effect that causes high hydro-dynamic torque particularly in a position corresponding to approximately 70° from the vertical closed position. This part of my invention is similar to and additionally explained in my previous U.S. Pat. No. 3,960,177.

While particular embodiments of the present invention have been herein illustrated and described, it is not intended to limit the invention to such disclosures but changes and modifications may be made herein and thereto within the scope of the following claims.

I claim:

1. Eccentric rotary disk valve for tight shut-off purposes comprising:
   a. tubular housing
   b. one inlet formed in said housing, inlet and outlet ends adapted to be coupled to a pipeline
   c. a straight cylindrical passage formed in said housing towards a stop shoulder, forming a reduced cross section at that point;
   d. a ring shaped seal retainer removably and adjustably placed within the straight cylindrical passage having an inner bore on an axis which is parallel to but offset from that of the exterior diameter of the seal retainer;
   e. a shaft located perpendicular to and offset from the longitudinal axis of the tubular housing and being retained on either end by the outer walls of said housing;
   f. an eccentric rotating disk tiltingly engaged with said shaft and within the reduced cross section of said housing, said disk having an annular continous, partially spherical periphery forming a seating surface;
   g. a flexible metal seal ring having a generally U-shaped cross-sectional configuration when viewed in the circumferential direction, wherein the outer straight portion of said U-shaped configuration is engaged within the inner bore of said seal retainer and suitably fastened to the same at its terminating end, while the inner straight portion of said U-shaped configuration forms a central circular seating bore to engage the eccentric disk in the closed valve position, the bottom portion of said U-shaped configuration facing said disk and the straight portions of said U-shaped configuration being generally parallel to said longitudinal axis of said tubular housing.

2. Eccentric rotary disk valve of claim 1 wherein said flexible metal seal ring has sufficient clearance between the inner bore of said seal retainer and a substantial length of the outer U-shaped portion of the seal to permit deflection of the seal in radial direction in order to adopt the inner circular diameter of the flexible metal seat ring to the configuration of said eccentric disk when in the closed valve position.

3. Valve of claim 1 wherein said disk encompasses two seperate hub portions having a common bore to receive and engage said shaft and where the center line of said shaft bore is offset from the spherical seating surface of said disk.

4. Valve of claim 1 wherein at least one of said hub portions retains removable fastening means engaging both hub and shaft to effect common rotary motion.

5. Valve of claim 1 wherein the eccentric rotating disk has an angularly offset essentially circular wall section interior of said angular, partly spherical seating surface and forming a combined Z-shaped cross sectional configuration.

* * * * *